(12) United States Patent
Yun

(10) Patent No.: US 8,351,060 B2
(45) Date of Patent: Jan. 8, 2013

(54) METHOD OF AND APPARATUS TO PRINT IMAGE DIRECTLY

(75) Inventor: Tae-jung Yun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1197 days.

(21) Appl. No.: 11/092,818

(22) Filed: Mar. 30, 2005

(65) Prior Publication Data

US 2005/0237568 A1    Oct. 27, 2005

(30) Foreign Application Priority Data

Apr. 22, 2004  (KR) .................. 10-2004-0027767

(51) Int. Cl.
*G06F 15/00* (2006.01)
*G06K 1/00* (2006.01)

(52) U.S. Cl. .................. 358/1.15; 358/1.9; 358/1.13

(58) Field of Classification Search .................. 358/1.1, 358/1.9, 1.11–1.18, 1.6, 296, 501, 502; 382/237; 348/211.4
See application file for complete search history.

(56) References Cited

U.S. PATENT DOCUMENTS

| | | | |
|---|---|---|---|
| 7,400,421 B2 * | 7/2008 | Endo et al. .................. | 358/1.13 |
| 2002/0030835 A1 | 3/2002 | Tanizawa et al. | |
| 2002/0054344 A1 | 5/2002 | Tateyama | |
| 2002/0178304 A1 | 11/2002 | Camera et al. | |
| 2003/0196011 A1 | 10/2003 | Shih | |
| 2004/0012805 A1 * | 1/2004 | Tojo .................. | 358/1.13 |
| 2004/0179221 A1 * | 9/2004 | Endo et al. .................. | 358/1.13 |
| 2004/0184078 A1 * | 9/2004 | Endo et al. .................. | 358/1.15 |
| 2004/0207869 A1 | 10/2004 | Endo | |
| 2005/0060447 A1 * | 3/2005 | Tanaka .................. | 710/62 |
| 2005/0141040 A1 | 6/2005 | Yamada et al. | |
| 2006/0109349 A1 * | 5/2006 | Takashima ............. | 348/207.1 |

FOREIGN PATENT DOCUMENTS

| | | |
|---|---|---|
| CN | 1477861 A | 2/2004 |
| JP | 2001-290612 | 10/2001 |
| JP | 2002271721 | 9/2002 |
| JP | 2004-056220 | 2/2004 |
| JP | 2004-070868 | 3/2004 |
| JP | 2004-088761 | 3/2004 |
| JP | 2004-112078 | 4/2004 |
| JP | 2004112078 A * | 4/2004 |
| KR | 2003-94512 | 12/2003 |
| KR | 2003-95263 | 12/2003 |
| WO | WO 2005001701 A1 * | 1/2005 |

OTHER PUBLICATIONS

CIPA, White Paper of CIPA DC-001-2003 Digital Photo Solutions for Imaging Devices. Feb. 3, 2003.*
White Paper of CIPA DC-001-2003. Feb. 3, 2003. Camera & Imaging Products Association. pp. 1-5.* Korean Office Action issued on Dec. 8, 2005 in 2004-27767.
Chinese Office Action dated Jul. 28, 2006 of Chinese Patent Application 200510066932.7.
CIPA, White Paper of CIPA DC-001-2003, Digital Photo Solutions for Imaging Devices, Feb. 3, 2003, Camera & Imaging Products Association.
Japanese Office Action issued Jun. 22, 2010 in JP Application No. 2005-125508.

* cited by examiner

*Primary Examiner* — Thierry Pham
(74) *Attorney, Agent, or Firm* — Stanzione & Kim, LLP

(57) ABSTRACT

A method and an apparatus to print an image file store in an image providing device by connecting the image providing device to an image printing device include determining a universal interface class supported by the image providing device, determining a connection mode between the image providing device and the image printing device according to the determined universal interface class, and printing an image file transmitted from the image providing device to the image printing device according to the determined connection mode.

14 Claims, 6 Drawing Sheets

METHOD OF AND APPARATUS TO PRINT IMAGE DIRECTLY

CROSS-REFERENCE TO RELATED APPLICATIONS

This application claims the benefit under 35 U.S.C §119 of Korean Patent Application No. 2004-27767, filed on Apr. 22, 2004, in the Korean Intellectual Property Office, the disclosure of which is incorporated herein in its entirety by reference.

BACKGROUND OF THE INVENTION

1. Field of the Invention

The present general inventive concept relates to a method and an apparatus to print an image directly, and more particularly, to a method and an apparatus to print an image directly by determining a connection mode between an image providing device and an image printing device according to a universal interface class of the image providing device, and to connect the image providing device to the image printing device in the determined connection mode.

2. Description of the Related Art

FIG. 1A illustrates a conventional printing system in which an image file stored in a digital still camera 100 is printed by an image printing device 300 via a computer 200. The digital still camera 100 is connected to the computer 200 via a predetermined wire or wireless universal interface, and the image printing device 300 is connected to the computer 200 via a predetermined wire or wireless universal interface. The universal interface may be a universal serial bus (USB), an IEEE (Institute of Electrical and Electronics Engineers) 1394, a wireless USB, or a WIFI interface. The digital still camera 100 is used to obtain an image and to store the obtained image. The digital still camera 100 acts as an image providing device which provides the stored image to the computer 200. Although the digital still camera 100 is explained below as an example of the image providing device, various other devices, such as a PDA, a portable telephone, an external storage medium that stores image files, or the like, can be used as the image providing device. In addition, a USB will be explained as a universal interface.

Typically, the digital still camera 100 supports both a still image class (SIC) and a mass storage class (MSC). A user obtains an image by using the digital still camera 100 and stores the obtained image in the digital still camera 100. When printing the stored image via the computer 200, the user is required to change the USB class of the digital still camera 100 to the MSC and connect the digital still camera 100 to the computer 200. The image file in the digital still camera 100 is selected through an OS (operating system) file system, and the selected image file is transferred to the computer 200 and processed through an image processing software. The processed image file is then transferred to the image printing device 300 from the computer 200 and printed by the image printing device 300.

FIG. 1B illustrates a conventional direct image printing system in which an image file in a digital still camera 100 is printed by connecting the digital still camera 100 directly to an image printing device 300 via a USB without using a computer.

The Camera and Imaging Products Association (CIPA) has developed a direct connection standard for digital still cameras and image printing devices by standardizing application services for these devices. The solution offered by the CIPA is "CIPA DC-001", which is hereinafter referred to as "Pict-Bridge." Every model of a PictBridge compliant digital still camera 100 can be connected directly to every PictBridge compliant image printing device 300 via a USB interface, thereby allowing images stored in the digital still camera 100 to be printed directly without using a computer.

In the conventional direct image printing system of FIG. 1B, a USB class of the digital still camera 100 must be defined as a still image class (SIC) in order to be PictBridge compliant. Accordingly, the USB class of the digital still camera 100 needs to be set to the still image class (SIC) before connecting the digital still camera 100 to the image printing device 300. When the digital still camera 100 is connected to the image printing device 300, a message indicating the connection is displayed on the digital still camera 100, and a user initiates a printing operation by selecting a predetermined image file corresponding to the images stored in the digital still camera 100, according to a predetermined method designated for the digital still camera 100. When the user inputs a print command to the digital still camera 100 via a user interface (UI), the selected image file is transferred to the image printing device 300 and printed according to the user's print command.

The PictBridge compliant direct image printing system of FIG. 1B enables users who don't know how to use a computer or image processing software to connect the digital still camera 100 directly to the image printing device 300 and print an image file conveniently and easily.

However, while the digital still camera 100 generally supports both the MSC and the SIC, the image printing device 300 defines the USB class of the digital still camera 100 as the SIC. Accordingly, before connecting the digital still camera 100 to the image printing device 300, the USB class must be set to the SIC so that the image printing device 300 can recognize the digital still camera 100.

Therefore, the USB class of the digital still camera 100 must be changed depending on whether a user intends to print an image by connecting the digital still camera 100 to the computer 200 or the digital still camera 100 directly to the image printing device 300. Moreover, a user cannot directly connect the digital still camera 100 to the image printing device 300 to print an image when the digital still camera 100 does not support the SIC.

SUMMARY OF THE INVENTION

The present general inventive concept provides a method and an apparatus to print an image file stored in a digital still camera directly by connecting the digital still camera directly to an image printing device regardless of a USB class of the digital still camera.

The present general inventive concept also provides a computer readable recording medium having embodied thereon a computer program providing a method of printing images directly.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing an apparatus including a connection controlling unit to determine a universal interface class supported by an image providing device and to determine a connection mode with the image providing device according to the determined universal interface class, and a print engine unit to receive and print an image file stored in the image providing device according to the determined connection mode. The apparatus may further include a communication interface to receive the image file stored in the image providing device, a memory to store the received image file, and a print controlling unit to control a printing operation of the image printing device.

The connection controlling unit may include a class determination unit to determine the universal interface class supported by the image providing device and a connection mode determination unit to determine the connection mode with the image providing device according to the determined universal interface class supported by the image providing device.

The foregoing and/or other aspects and advantages of the present general inventive concept are also achieved by providing a method of directly printing an image file stored in an image providing device in a printing system in which the image providing device is connected to an image printing device via a universal interface, the method including determining a universal interface class supported by the image providing device, determining a connection mode between the image providing device and the image printing device according to the determined universal interface class, and printing an image file transmitted from the image providing device according to the determined connection mode.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1A:
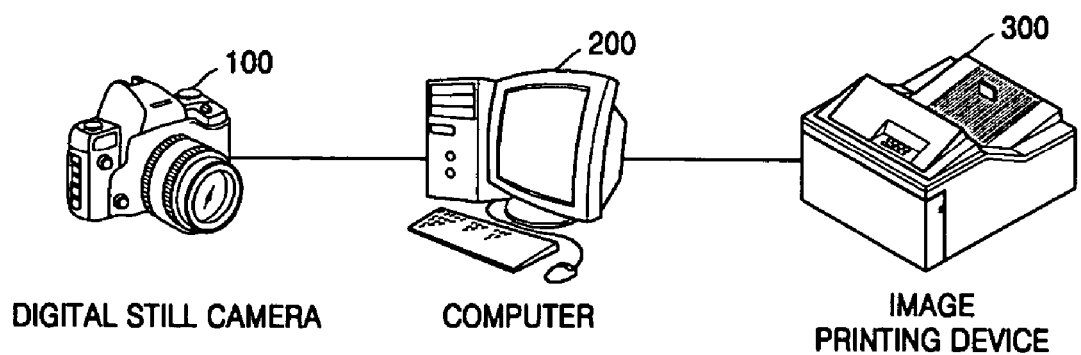
FIG. 1A illustrates a conventional printing system in which an image file stored in a digital still camera is printed by an image printing device using a computer.
Figure 1B:
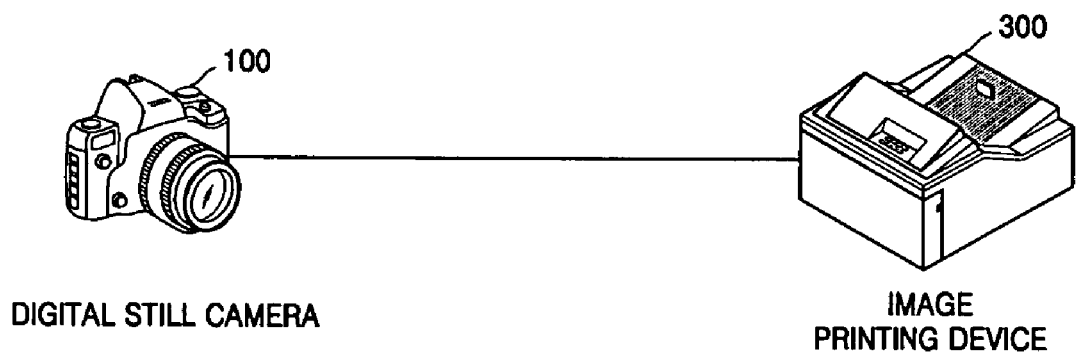
FIG. 1B illustrates a conventional direct image printing system in which an image file of a digital still camera is printed by connecting the digital still camera directly to an image printing device, without connecting the digital still camera to a computer.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
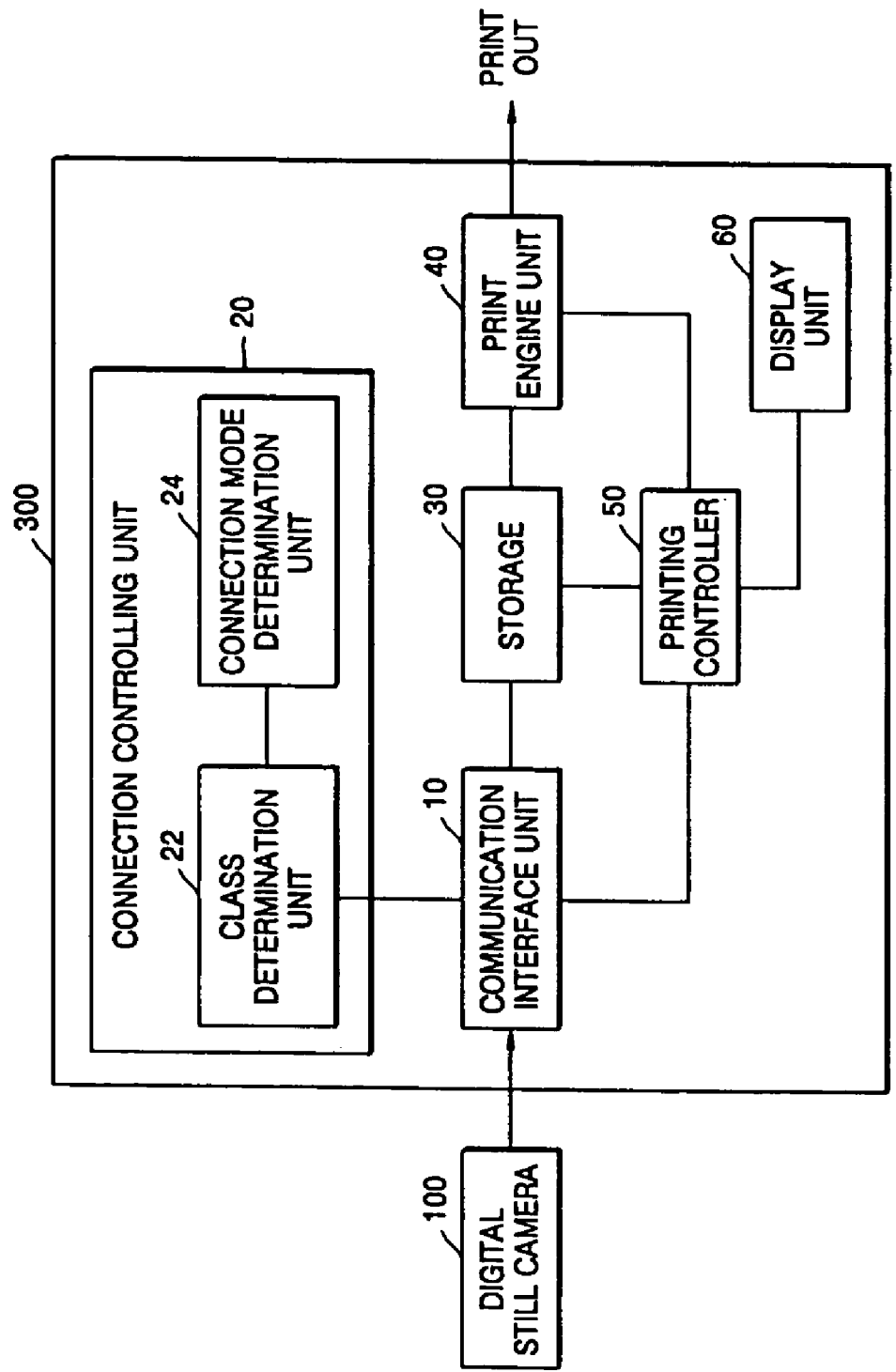
FIG. 2 illustrates a direct image printing system including a direct image printing device according to an embodiment of the present general inventive concept.

FIG. 2 is a functional block diagram of a direct image printing device 300' according to an embodiment of the present general inventive concept. Referring to FIG. 2, the image printing device 300' includes a communication interface unit 10, a connection controlling unit 20, a storage unit 30, a print engine unit 40 and a printing controller 50. The image printing device 300' may further include a display unit 60, and the connection controlling unit 20 may include a class determination unit 22 and a connection mode determination unit 24.

When a digital still camera 100 is connected to the image printing device 300' via a USB, the image printing device 300' communicates with the digital still camera 100 through the USB via the communication interface unit 10. The class determination unit 22 of the connection controlling unit 20 determines a USB class supported by the digital still camera 100 by communicating with the digital still camera via the communication interface unit 10. Accordingly, the digital still camera 100 transfers USB class information to the class determination unit 22. The USB class information includes information about whether the digital still camera 100 supports a still image class (SIC) or a mass storage class (MSC). The class determination unit 22 determines the USB class (i.e. the SIC or the MSC) supported by the digital still camera 100 according to the transferred USB class information.

The connection mode determination unit 24 determines a connection mode between the digital still camera 100 and the image printing device 300' based on the USB class supported by the digital still camera 100 determined by the class determination unit 22. When the class determination unit 22 determines that the digital still camera 100 supports the SIC, the connection mode determination unit 24 determines whether the digital still camera 100 supports a PictBridge standard. In a case in which the USB class supported by the digital still camera 100 is determined to be the SIC, and the digital still camera 100 supports the PictBridge standard, the connecting mode between the digital still camera 100 and the image print device 300' can be referred to as an SIC connection mode. If it is determined that the digital still camera 100 supports the PictBridge standard, the digital still camera 100 and the image printing device 300' establish the SIC connection mode. In the SIC connection mode, the digital still camera 100 and the image printing device 300' communicate with each other as a USB device and a USB host, respectively, according to the PictBridge standard. More particularly, the image printing device 300' operates as a print server and the digital still camera 100 operates as a print client and makes a request to the print server to initiate a printing operation. Also, the digital still camera 100 operates as a storage server and the image printing device 300' operates as a storage client and retrieves an image file stored on the storage server to print the image file. Additionally, operations of the image printing device 300' are transferred to the digital still camera 100 to be controlled by the digital still camera 100 in the SIC mode.

When the connection mode determination unit 22 determines that the digital still camera 100 does not support the PictBridge standard, the connection mode determination unit 22 determines whether the digital still camera 100 includes an exclusive print protocol corresponding to the image printing device 300'. The exclusive print protocol is designed to allow a specific type of digital still camera to communicate with a specific type of image printing apparatus, such as a digital still camera and an image printing apparatus designed and manufactured by the same manufacturer. When the digital still camera 100 includes the exclusive print protocol corresponding to the image printing device 300', the connection mode is determined to be an exclusive print protocol connection mode, and the image printing apparatus 300' and the digital still camera 100 communicate with each other according to the exclusive print protocol to transfer and print the image file.

Meanwhile, when the class determination unit 22 determines that the USB class supported by the digital still camera 100 is the MSC, the connection mode determination unit 24 recognizes the digital still camera 100 as an external storage medium. If the USB class of the digital still camera 100 supports the MSC, the connecting mode in which the digital still camera 100 is connected to the image printing device 300 as an external storage medium can be referred to as an MSC connection mode. In the MSC connection mode, the image file of the digital still camera 100 is selected by the image printing device 300' using an OS (operating system) file system of the image printing device 300', and the selected image file is transferred to the image printing device 300' and printed.

When the connection mode corresponding to the USB class supported by the digital still camera 100 is determined, the image file of the digital still camera 100 is transferred to the image printing device 300' via the communication interface 10 according to the determined connection mode. The user can select the image file and process the selected image via a user interface of the digital still camera 100. The printing controller 50 controls the general operations of the image printing device 300'. The display unit 60 of the image printing device 300' displays print status information of the image printing device 300', such as the condition of the connection between the image printing device 300' and the digital still camera 100, a printing error, the printing progress and so on.

The selected and processed image file of the digital still camera 100 is transferred to the image printing device 300' via the communication interface 10 according to the determined connection mode, and the transferred image file is stored in the storage unit 30. The stored image file is then printed by the print engine unit 40.

Figure 3:
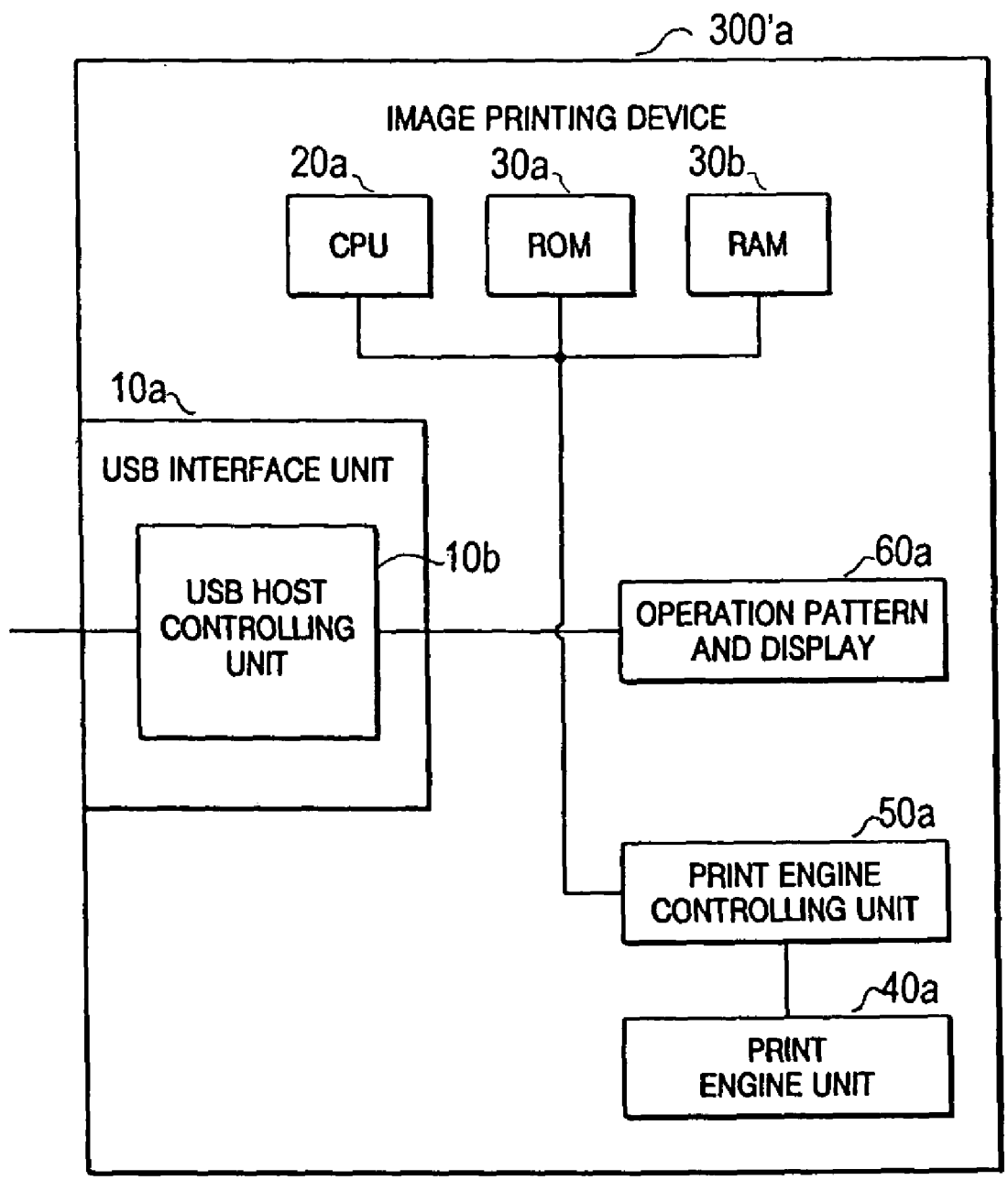
FIG. 3 illustrates an exemplary embodiment of the direct image printing device of FIG. 2.

FIG. 3 illustrates an exemplary embodiment of the direct image printing device 300'a of FIG. 2. Referring to FIG. 3, the image printing device 300'a includes a USB interface unit 10a, a CPU 20a, a ROM 30a, a RAM 30b, operation keys and display 60a, a print engine control unit 50a, and a print engine 40a.

The CPU 20a controls the overall operations of the image printing device 300'a according to programs stored in the ROM 30a and the RAM 30b. The programs determine the USB class of the digital still camera 100 and the image printing device 300'a when the digital still camera 100 is connected to the image printing device 300'a. The ROM 30a and the RAM 30b store and provide access to program data and protocol data, under control of the CPU 20a. The operation keys and display 60a include a plurality of keys and a display, wherein keys generate key data and the display displays the result of processing performed by the CPU 20a in response to input of the key data to the CPU 20a. The USB interface unit 10a includes a USB host control unit 10b and performs initial operations needed to connect the digital still camera 100 to the image printing device 300'a via the USB, under the control of the CPU 20a. The print engine control unit 50a and the print engine 40a print the image data received from the digital still camera 100 under the control of the CPU 20a.

Figure 4:
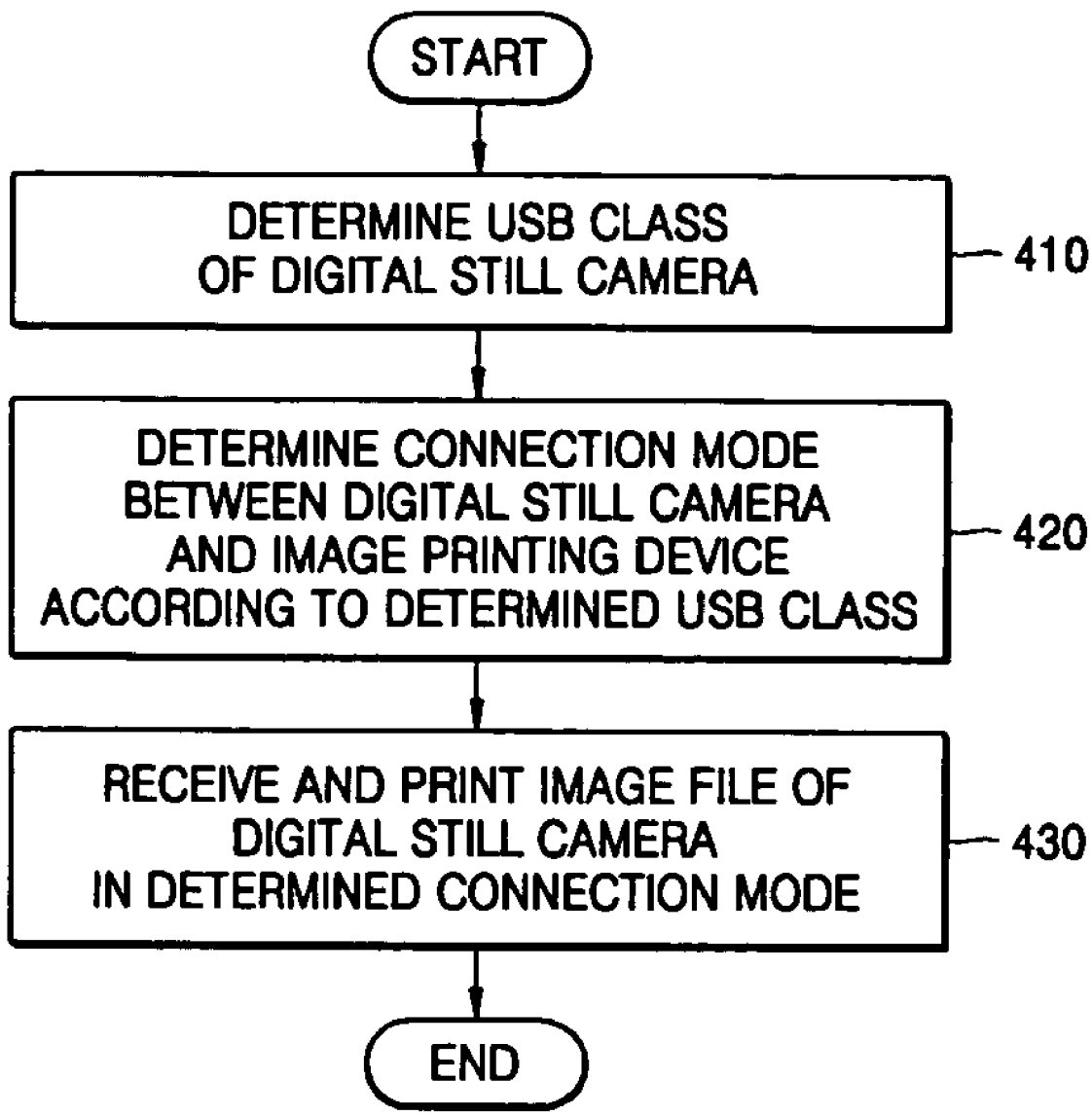
FIG. 4 illustrates a method of printing an image file by connecting a digital still camera directly to an image printing device according to an embodiment of the present general inventive concept.
Figure 5:
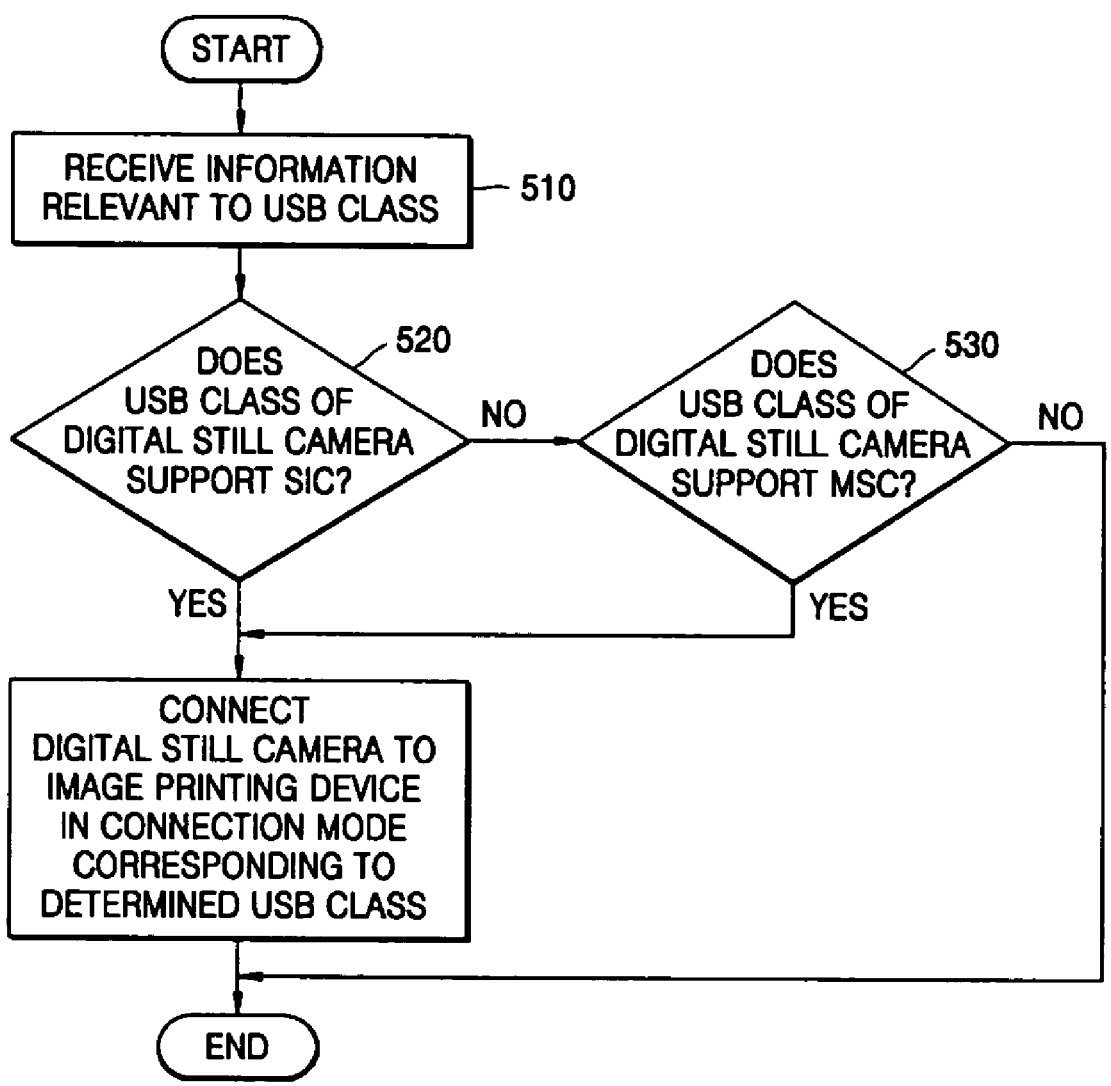
FIG. 5 illustrates a method of determining a USB class of the digital still camera of the method of FIG. 4.

FIG. 4 is a flowchart illustrating a method of printing an image file stored in the digital still camera 100 by connecting the digital still camera 100 directly to the image printing device 300' according to an embodiment of the present general inventive concept. When the digital still camera 100 is connected to the image printing device 300', the USB class supported by the digital still camera 100 is determined (Operation 410). The digital still camera 100 may support both the SIC and the MSC, and in such a case, it is determined which one of the SIC and the MSC the digital camera 100 is set to support when the digital camera is connected to the printing device 300'. In FIG. 5, the operation of determining the USB class supported by the digital still camera 100 is explained in greater detail. After the USB class supported by the digital still camera 100 is determined, the connection mode between the digital still camera 100 and the image printing device 300' is determined according to the determined USB class (Operation 420). Then the image file of the digital still camera 100 is received by the image printing device 300' from the digital camera 100 according to the determined connection mode and printed (Operation 430). The operations of determining the connection mode between the digital still camera 100 and the image printing device 300' according to the determined USB class, when the determined USB class is the SIC, are described in greater detail in FIG. 6. The operations of determining the connection mode between the digital still camera 100 and the image printing device 300' according to the determined USB class, when the determined USB class is the MSC, are explained in greater detail in FIG. 7.

FIG. 5 is a flowchart illustrating the operations of determining the USB class supported by the digital still camera 100. When the digital still camera 100 is connected to the image printing device 300', the image printing device 300' receives the USB class information from the digital still camera 100 (Operation 510). Then the image printing device 300' determines whether the digital still camera 100 supports the SIC (Operation 520) according to the received USB class information. When the digital still camera 100 is determined not to support the SIC, it is determined whether the digital still camera 100 supports the MSC (Operation 530) according to the received USB class information. When the digital still camera 100 is determined to support either one of the SIC and the MSC, the connection mode between the digital still camera 100 and the image printing device 300' is determined corresponding to the determined USB class supported by the digital still camera 100. When the digital still camera 100 is determined to support neither the SIC nor the MSC, the image printing operation of the digital still camera 100 is terminated.

Figure 6:
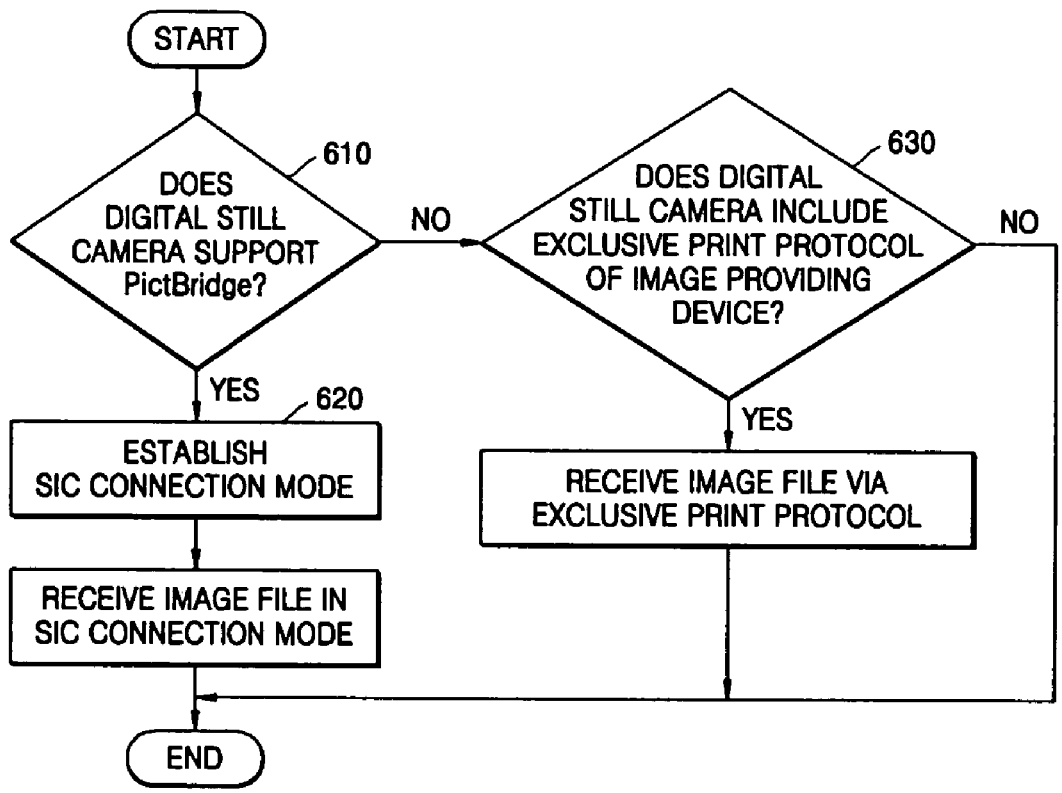
FIG. 6 illustrates a method of determining a connection mode between the digital still camera and the image printing device of the method of FIG. 4 when the digital still camera is determined to support an SIC.

FIG. 6 is a flowchart illustrating the operations of determining the connection mode between the digital still camera 100 and the image printing device 300' when the USB class supported by the digital still camera is determined to be the SIC. When the digital still camera 100 is determined to support the SIC, the image printing device 300' determines whether the digital still camera 100 supports the PictBridge standard (Operation 610). If the digital still camera 100 supports the PictBridge standard, the SIC connection mode is determined (Operation 620).

In the SIC connection mode, the digital still camera 100 communicates with the image printing device 300' according to the PictBridge standard. Accordingly, the digital still camera 100 operates as a host of the storage server and as a client of the print server, and the image printing device 300' operates as a client of the storage server and as a host of the print server. The digital still camera 100 then receives the operations of the image printing device 300' which are used to control the image printing device 300' to receive the image file from the digital still camera and to print the received image file. The received operations of the image printing device 300' are displayed on a display unit of the digital still camera 100.

In the meantime, if the digital still camera 100 is determined not to support the PictBridge standard, the image printing device 300' determines whether the digital still camera 100 includes an exclusive print protocol corresponding to the image printing device 300' (Operation 630). If the digital still camera 100 is determined to include an exclusive print protocol corresponding to the image printing device 300', the connection mode between the digital still camera 100 and the image printing device 300' is determined to be an exclusive print protocol connection mode, and the image files stored in the digital still camera 100 are transferred and printed. However, if the digital still camera 100 is determined not to include an exclusive print protocol corresponding to the image printing device 300', the image printing operation is terminated.

Figure 7:
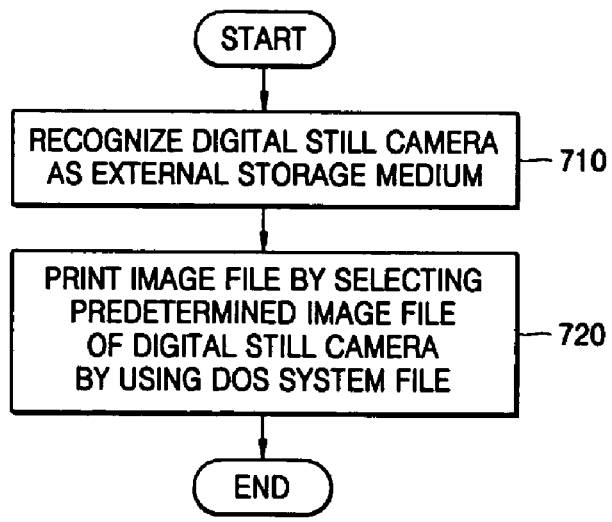
FIG. 7 illustrates a method of determining a connection mode between the digital still camera and the image printing device of the method of FIG. 4 when the digital still camera is determined to support an MSC.

FIG. 7 is a flowchart illustrating the operation of determining the connection mode between the digital still camera 100 and the image printing device 300' when the USB class supported by the digital still camera 100 is determined to be the MSC. When the USB class supported by the digital still camera 100 is determined to be the MSC, the image printing device 300' recognizes the digital still camera 100 as an external storage medium (Operation 710). The image printing device 300' may include the display unit 60, and the image file intended to be printed may be selected among image files of the digital still camera 100 displayed on the display unit 60 by selecting the image file from the OS file system of the image printing device 300'. The selected image file is transferred to the storage medium 40 via the communication interface 10 of the image printing device, and is printed (Operation 720).

Although a digital still camera is described above as being connected to the image printing device to provide an image, the present general inventive concept is not limited thereto. Alternatively, various other devices, such as a PDA, a portable telephone, an external storage medium that stores image files, or the like, can be used as an image providing device. In addition, although a USB is described above as connecting the image printing device to the digital still camera, the present general inventive concept is not limited thereto. Various other types of wire or wireless universal interfaces can be used as an alternative to the USB.

Further, the various embodiments of the present general inventive concept, as described above, can be written as computer programs and can be implemented in general-use digital computers that execute the programs using a computer readable recording media.

Examples of the computer readable recording media include magnetic storage media (e.g., ROM, floppy disks, hard disks, etc.), optical recording media (e.g., CD-ROMs, or DVDs), and storage media such as carrier waves (e.g., transmission through the Internet).

As described above, the present general inventive concept provides a method and an apparatus to print an image file stored in a digital still camera by directly connecting the digital still camera and an image printing device regardless of the USB class of the digital still camera. Accordingly, users need not change the USB class when connecting the digital still camera to the image printing device. Further, the present general inventive concept provides a method and an apparatus to print an image file by connecting the digital still camera directly to the image printing device even if the digital still camera does not support a PictBridge standard, but only an MSC. Moreover, the present general inventive concept provides a method and an apparatus to print an image file by connecting the digital still camera directly to the image printing device even if the digital still camera supports the PictBridge standard.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A printer to directly print an image file stored in a digital still camera, and connected to the digital still camera via a universal interface, the printer comprising:
   a communication interface unit to communicate with the digital still camera when the digital still camera is connected to the printer via the universal interface, and to receive the image file stored in the digital still camera according to a connection mode;
   a connection controlling unit to determine a connection mode between the digital still camera and the printer to be a still image class (SIC) connection mode when the universal interface class supported by the digital still camera is an SIC, and to be a mass storage class (MSC) connection mode when the universal interface class supported by the digital still camera is an MSC;
   a memory to store the received file;
   a print engine unit to print the received image file; and
   a print controlling unit to control the print engine unit to print the stored image file,
   wherein the connection controlling unit further comprises:
   a connection mode determination unit to determine the connection modes with the digital still camera according to the determined universal interface classes supported by the digital still camera.

2. The apparatus of claim 1, wherein the connection mode determination unit determines one of the connection modes with the digital still camera and the printer to be a still image class (SIC) connection mode when the universal interface class supported by the digital still camera is determined to be an SIC and the digital still camera supports a PictBridge standard.

3. The apparatus of claim 1, wherein the connection mode determination unit determines one of the connection modes with the digital still camera and the printer to be a mass storage class (MSC) connection mode when the universal interface class supported by the digital still camera is determined to be an MSC.

4. The apparatus of claim 1, wherein the digital still camera is one of a personal digital assistant, a cellular phone, and an external storage medium.

5. A method of directly printing an image file stored in a digital still camera connected to a printer via a universal interface, the method comprising:
   connecting the digital still camera to the printer
   determining whether at least one of a plurality of universal interface classes are supported by the digital still camera including receiving SIC and MSC USB class information via a class determination unit;
   determining a connection mode from among a plurality of connection modes between the digital still camera and the printer according to the determined universal interface classes; and
   printing an image file transmitted from the digital still camera to the printer using the determined connection modes, wherein the determining of one of the connection modes between the digital still camera and the printer to be an SIC connection mode comprises:
communicating between the digital still camera and the printer so that the digital still camera operates as a client of a printer server and as a host of a storage medium, and the printer operates as a host of the printer server and as a client of the storage medium.

6. The method of claim 5, wherein the determining of one of the connection modes between the digital still camera and the printer comprises:
determining whether the digital still camera supports a PictBridge standard when it is determined that one of the universal interface classes supported by the digital still camera is the SIC; and
determining one of the connection modes between the digital still camera and the printer to be an SIC connection mode when it is determined that the digital still camera supports the PictBridge standard.

7. The method of claim 6, wherein the determining of one of the connection modes between the digital still camera and the printer further comprises:
determining whether the digital still camera includes an exclusive print protocol corresponding to the printer when it is determined that the digital still camera does not support the PictBridge standard; and
determining one of the connection modes between the digital still camera and the printer to be an exclusive print protocol mode when the digital still camera is determined to include the exclusive print protocol corresponding to the printer.

8. The method of claim 5, wherein the determining one of the connection modes between the digital still camera and the printer according to at least one of the determined universal interface classes comprises:
determining one of the connection modes between the digital still camera and the printer to be an MSC connection mode when the universal interface class supported by the image providing device is the MSC.

9. The method of claim 8, wherein the determining of one of the connection modes between the digital still camera and the printer to be an MSC connection mode comprises:
recognizing the digital still camera as an external storage medium; and
selecting an image file stored in the digital still camera through a predetermined system file.

10. The method of claim 5, wherein the digital still camera is one of a PDA, and an external storage medium.

11. A printer, comprising:
a communication unit to provide a communication link with a digital still camera;
a connection controlling unit having a class determination unit to receive SIC and MSC USB class information from the digital still camera and to determine a plurality of USB classes supported by the digital still camera by communicating with the digital still camera through the communication unit and according to information received therefrom through the communication unit; and
a connection mode determination unit to determine between a plurality of connection modes between the digital still camera and the printer based on the determined USB classes.

12. A direct printing system, comprising:
a digital still camera to provide an image;
a printer to print the image provided by the digital still camera, and comprising:
a connection controlling unit to determine a plurality of universal interface classes supported by the digital still camera by receiving SIC and MSC USB class information into a class determination unit,
a communication interface unit to communicate with the digital still camera to receive at least one image provided by the digital still camera according to the determined universal interface classes, and
a print engine unit to print the received at least one image to correspond to each of the determined universal interface classes; and
a universal interface to provide a communication link between the digital still camera and the communication interface unit of the printer.

13. The direct printing system of claim 12, wherein the digital still camera comprises a display and a user controls the printer via the display of the digital still camera.

14. The direct printing system of claim 12, wherein when one of the universal interface classes supported by the digital still camera is determined to be a still image class (SIC) and the digital still camera does not support a PictBridge standard, the connection controlling unit determines whether the digital still camera supports an exclusive print protocol corresponding to the printer.

* * * * *